F. H. ALLEN.
GASOLENE TRACTION ENGINE.
APPLICATION FILED APR. 10, 1913.
1,123,158.
Patented Dec. 29, 1914.
4 SHEETS—SHEET 1.
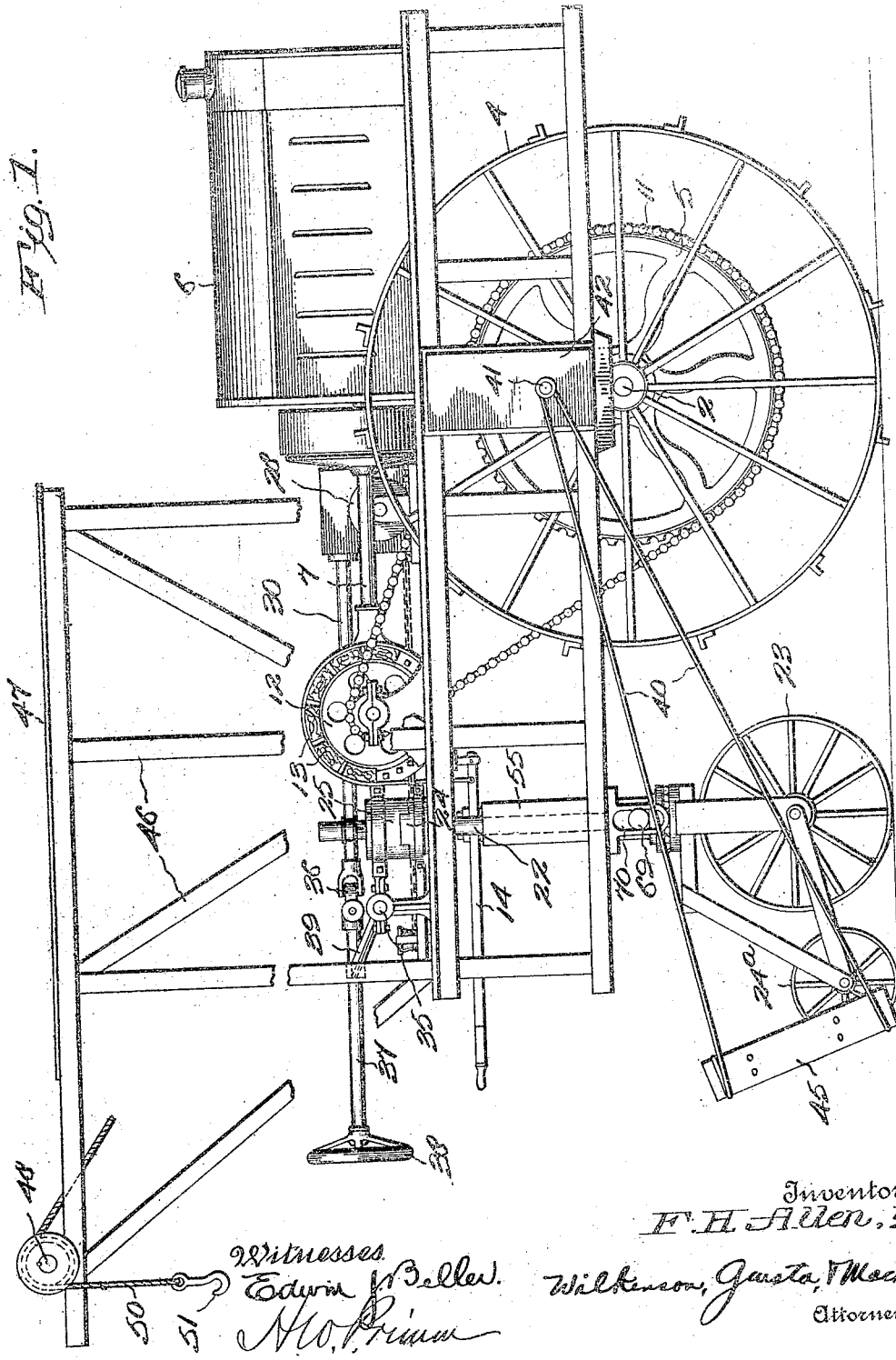

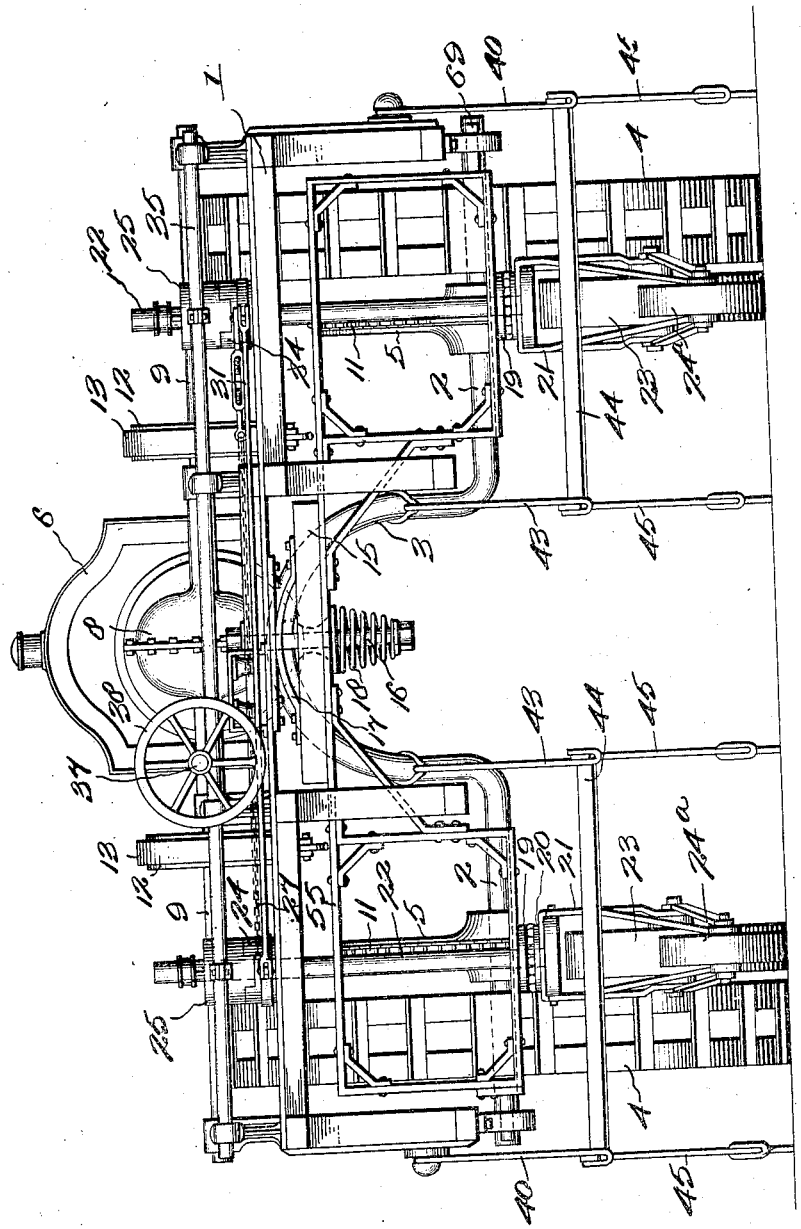

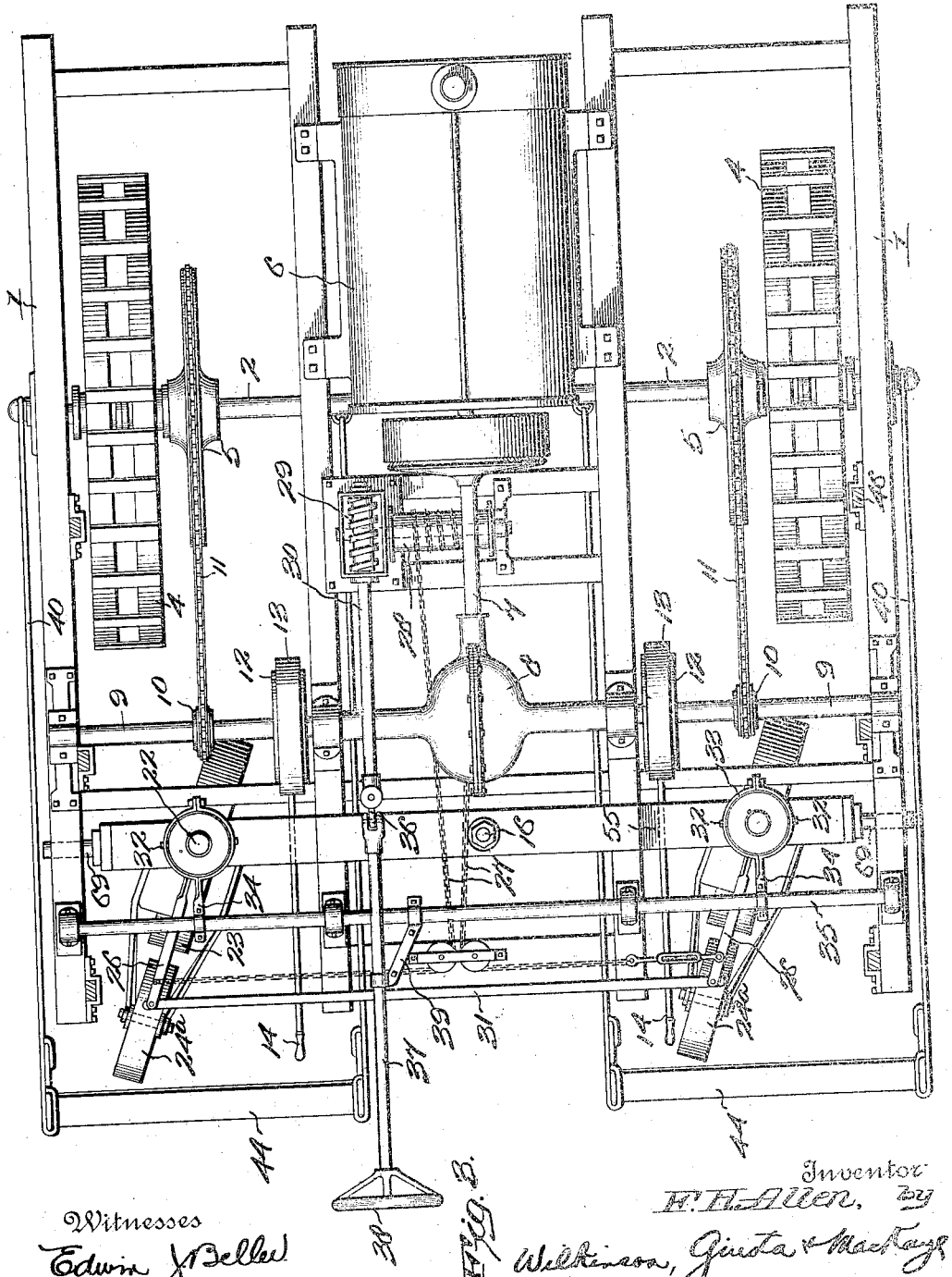

F. H. ALLEN.
GASOLENE TRACTION ENGINE.
APPLICATION FILED APR. 10, 1913.
1,123,158.
Patented Dec. 29, 1914.
4 SHEETS—SHEET 4.
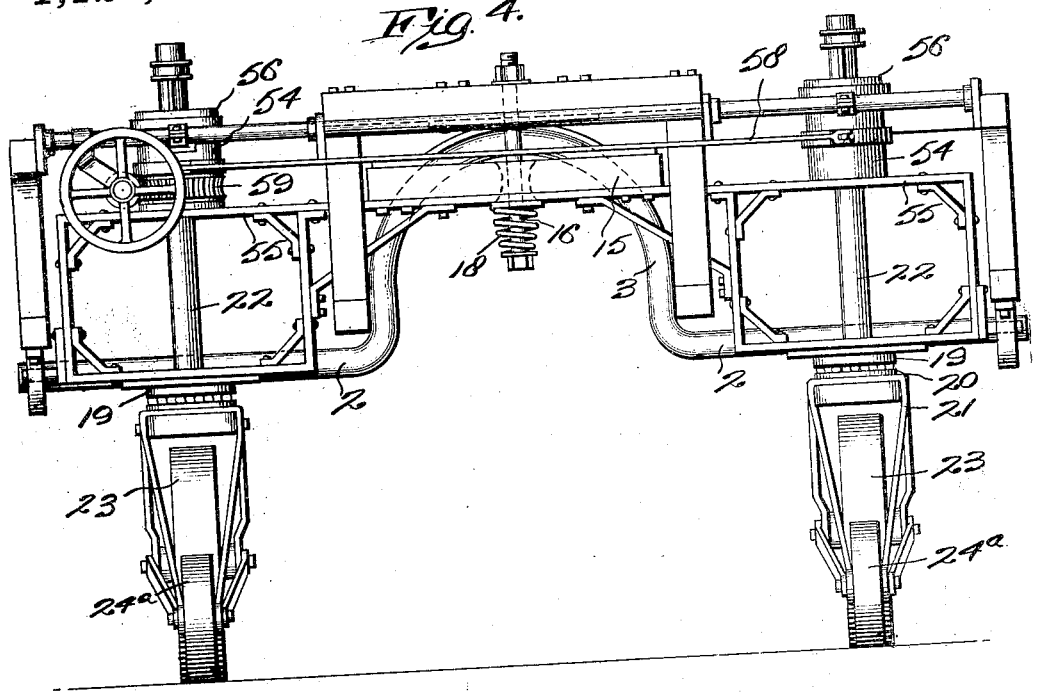
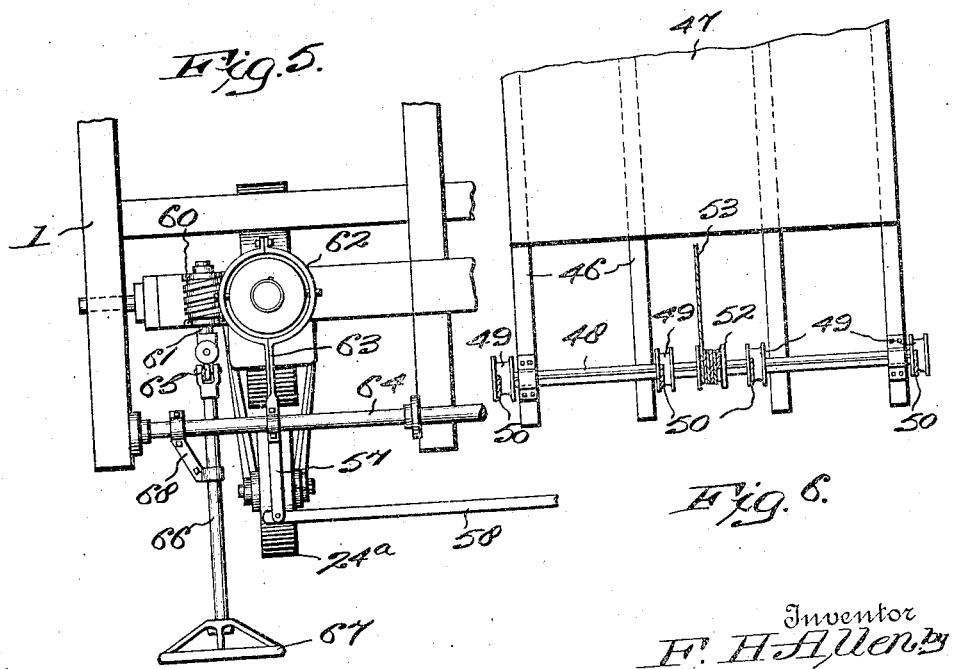
Witnesses
Inventor
F. H. Allen
Wilkinson, Guesta & MacKaye
Attorneys

UNITED STATES PATENT OFFICE.

FRANK H. ALLEN, OF DONALDSONVILLE, LOUISIANA.

GASOLENE TRACTION-ENGINE.

1,123,158. Specification of Letters Patent. Patented Dec. 29, 1914.

Application filed April 10, 1913. Serial No. 760,306.

*To all whom it may concern:*

Be it known that I, FRANK H. ALLEN, a citizen of the United States, residing at Donaldsonville, in the parish of Ascension and State of Louisiana, have invented certain new and useful Improvements in Gasolene Traction-Engines; and I do hereby declare the following to be a full, clear, and exact description of the invention, such as will enable others skilled in the art to which it appertains to make and use the same.

My invention relates to improvements in motor tractors, and it consists in the constructions, combinations and arrangements herein described and claimed.

An object of my invention is to provide an improved motor tractor having a short wheel base and provided with highly advantageous guiding and turning means.

A further object of my invention is to provide an improved motor tractor especially adapted for plows or other cultivator implements, which will operate efficiently for cultivating rows of sugar cane, or other tall plants.

In the accompanying drawings forming a part of this application and in which similar reference symbols indicate corresponding parts in the several views:—Figure 1 is a side elevation, illustrating one embodiment of my invention; Fig. 2 is a rear elevation thereof, with the upper framework omitted; Fig. 3 is a plan view of the construction shown in Fig. 2; Fig. 4 is a detail rear elevation, illustrating a modified construction; Fig. 5 is a fragmentary plan view of the construction shown at the left hand of Fig. 4; and Fig. 6 is a fragmentary plan view of the rear end of the upper framework and roof shown in Fig. 1.

Referring to the drawings, 1 indicates the bed frame, or body, of a tractor provided with a front axle 2 having an upwardly arched intermediate portion 3 for clearing rows of tall plants such as sugar cane; a pair of rigidly connected traction ground wheels 4 and sprocket wheels 5 being journaled on the respective ends of said axle.

A suitable motor 6 is carried by the tractor body with its drive shaft 7 connected to a differential transmission gear 8; the independent sections 9 of the differential shaft being journaled on the body 1 and carrying sprocket pinions 10 connected to the sprocket wheels 5 by chains 11. Each of the independent shafts 9 is provided with a brake drum 12 adapted to be engaged by a brake band 13 connected to a manually-operated lever 14; said brakes providing means whereby the rotation of either of the shafts 9 can be checked to any degree or completely stopped independent of the other of said shafts 9. This provides a highly advantageous and efficient means for guiding the tractor, and enables short turnings to be made for guiding the tractor from one row of plants to the next adjacent row.

A bolster 15 is centrally supported on the tractor body 1 by a king pin 16 and provided with an arc-shaped plate 17 held in engagement with said tractor body by a strong spring 18; the king pin 16 extending loosely through a slot in said plate 17 and a flaring opening in said bolster for permitting slight rocking of the latter. The bolster 15 carries two lateral frames provided with thrust bearings 19 for the heads 20 of the yokes 21 on the lower ends of vertical spindles 22; said yokes carrying guiding ground wheels 23 and follower guide wheels 24ª. Said lateral frames are provided with pins 69 engaging guiding slots 70 in the tractor body. The upper ends of the vertical spindles 22 extend loosely through clutch members 24 supported on the tractor body in position for coöperation with shiftable clutch members 25 splined on said spindles 22. The loosely mounted clutch members 24 are provided with cranks 26 connected by a link 31, and to which are connected chains 27 wound in opposite directions on the drum 28; said drum being provided with a worm wheel in mesh with a worm 29 on a manually-operated steering shaft 30. This provides convenient and effective means for simultaneously rotating the two clutch members 24. The splined clutch members 25 are provided with annular grooves for receiving the pins 32 of gimbal rings 33, which latter are provided with arms 34 clamped to a transverse shaft 35 on the tractor bed. The steering shaft 30 is connected by a universal joint 36 with an extension 37 provided with a hand wheel 38; said extension 37 being clamped by an arm 39 to the transverse shaft 35, to provide convenient means for rocking said shaft to shift the splined clutch members 25 into and out of engagement with the loosely mounted clutch members 24. In this improved construction, when the clutch members 25 are raised from engagement with the loosely mounted clutch members 24, the vertical spindles 22 are entirely free to turn independently for permitting the guiding ground wheels carried thereby to track in the furrows. On the other hand, when the clutch members 24 and 25 are shifted into engagement, the vertical spindles 22 are locked together and can be simultaneously rotated for shifting the guide ground wheels 23 and 24ª by turning the hand wheel 38 to rotate the winding drum 28.

Outer draft rods 40 are pivoted at 41 to plates 42 on the tractor bed in coöperative relation with similar inner rods 43 swingingly connected to the arched axle portion 3; said inner and outer coöperative draft rods being connected by cross bars 44 and carrying apertured plates 45 to constitute clevises for plows or other cultivator implements.

The tractor bed is provided with an upper framework 46 carrying roofing 47 and having a transverse shaft 48 journaled therein; said shaft having a series of sheaves 49 splined thereon and carrying cables 50 provided with hooks 51 for engaging the apertured plates 45 to raise the cultivator implements from the ground when desired, as in turning the tractor. The shaft 48 carries a sheave 52 on which is wound a chain 53 for rotating said shaft; said chain 53 being actuated in any convenient manner, as by hand or by a drum on the tractor.

Figs. 4 and 5 illustrate a modification, in which the vertical spindles 22 extend loosely through clutch members 54 supported on the lateral frames 55 of the bolster 15 in position for coöperation with shiftable clutch members 56 splined on said spindles 22; said loosely mounted clutch members 54 being provided with cranks 57 connected by a link 58. One of the clutch members 54 is provided with a worm wheel 59 in mesh with a worm 60 on a steering shaft 61. The splined members 56 are provided with annular grooves for receiving the pins of gimbal rings 62, which latter are provided with arms 63 clamped to a transverse shaft 64 journaled on said lateral bolster frames 55.

The steering shaft 61 is connected by a universal joint 65 with an extension 66 provided with a hand wheel 67; said extension 66 being clamped by an arm 68 to the transverse shaft 64, to provide convenient means for rocking said shaft to shift the splined clutch members 56 into and out of engagement with the loosely mounted clutch members 54.

I have illustrated and described preferred and satisfactory constructions, but changes could be made within the spirit and scope of my invention.

I claim:—

In a motor tractor, the combination of a tractor body, a bolster, a slotted arc-shaped plate on said bolster rockingly engaging said tractor body, a king pin extending through said tractor body and bolster and through the slot of said plate, a spring engaging said bolster for yieldingly maintaining said arc-shaped plate in rocking engagement with said tractor bed, pins mounted on the sides of the rocking bolster, and guides on said tractor body for engaging said pins for confining the movement of said rocking bolster to swing in a vertical plane.

In testimony whereof, I affix my signature, in presence of two witnesses.

FRANK H. ALLEN.

Witnesses:
  O. M. ODELL,
  F. J. RUBISKI.